US012630901B1

(12) United States Patent
Li et al.

(10) Patent No.: US 12,630,901 B1
(45) Date of Patent: May 19, 2026

(54) METHOD FOR LITHIUM EXTRACTION BY LEACHING FROM SPODUMENE AND DESULFURIZATION

(71) Applicant: Institute of Process Engineering, Chinese Academy of Sciences, Beijing (CN)

(72) Inventors: Huiquan Li, Beijing (CN); Jianbo Zhang, Beijing (CN); Chennian Yang, Beijing (CN); Wenfen Wu, Beijing (CN); Chenye Wang, Beijing (CN); Zhenhua Sun, Beijing (CN)

(73) Assignee: Institute of Process Engineering, Chinese Academy of Sciences, Beijing (CN)

( * ) Notice: Subject to any disclaimer, the term of this patent is extended or adjusted under 35 U.S.C. 154(b) by 0 days.

(21) Appl. No.: 19/423,815

(22) Filed: Dec. 17, 2025

(30) Foreign Application Priority Data

Dec. 17, 2024 (CN) ......................... 202411857665.4
Jun. 25, 2025 (CN) ......................... 202510860969.4

(51) Int. Cl.
*C22B 26/12* (2006.01)
*B03B 1/04* (2006.01)
(Continued)

(52) U.S. Cl.
CPC ................ *C22B 26/12* (2013.01); *B03B 1/04* (2013.01); *B03D 1/004* (2013.01); *B03D 1/02* (2013.01);
(Continued)

(58) Field of Classification Search
None
See application file for complete search history.

(56) References Cited

FOREIGN PATENT DOCUMENTS

| | | | | |
|---|---|---|---|---|
| CN | 214990723 U | * 12/2021 | | |
| CN | 114226413 A | * 3/2022 | .............. | B09B 5/00 |

(Continued)

OTHER PUBLICATIONS

English translation of CN-118847346-A Description. (Year: 2024).*
English translation of CN-214990723-U Description. (Year: 2021).*
English translation of CN-114226413-A Description. (Year: 2022).*

*Primary Examiner* — Anthony J Zimmer
*Assistant Examiner* — Zachary John Baum
(74) *Attorney, Agent, or Firm* — Osha Bergman Watanabe & Burton LLP

(57) ABSTRACT

A method for lithium extraction by leaching from spodumene and desulfurization is provided. The method includes: extracting lithium by leaching from spodumene to obtain lithium leaching solution and spodumene smelting slag; performing desulfurization on the spodumene smelting slag to obtain a gypsum product and desulfurized lithium slag; wherein the desulfurization comprises: S21, mixing the spodumene smelting slag with water, and adjusting a pH value to 8-12.5 to prepare a mineral slurry; S22, adding a conditioning agent to the mineral slurry for conditioning to obtain slurry 1; wherein the conditioning agent includes sodium silicate, sodium citrate, and ethylenediaminetetra (methylenephosphonic acid) sodium salt; and S23, adding a collecting agent to slurry 1, performing flotation desulfurization, followed by filtration and drying, to obtain the gypsum product and the desulfurized lithium slag. The desulfurization method provided in the present disclosure achieves high desulfurization efficiency and a simple process flow.

20 Claims, 2 Drawing Sheets

(51) Int. Cl.

| | |
|---|---|
| ***B03D 1/004*** | (2006.01) |
| ***B03D 1/02*** | (2006.01) |
| ***B03D 1/08*** | (2006.01) |
| ***C22B 1/02*** | (2006.01) |
| ***C22B 3/06*** | (2006.01) |
| ***C22B 3/22*** | (2006.01) |

(52) U.S. Cl.

CPC ................ *B03D 1/082* (2013.01); *C22B 1/02* (2013.01); *C22B 3/06* (2013.01); *C22B 3/22* (2013.01)

(56) References Cited

FOREIGN PATENT DOCUMENTS

| | | | | | |
|---|---|---|---|---|---|
| CN | 118847346 A | * | 10/2024 | ............... | B03B 1/00 |
| CN | 119663007 A | | 3/2025 | | |
| CN | 120591586 A | | 9/2025 | | |
| CN | 120662461 A | | 9/2025 | | |

* cited by examiner

METHOD FOR LITHIUM EXTRACTION BY LEACHING FROM SPODUMENE AND DESULFURIZATION

CROSS-REFERENCE TO RELATED APPLICATIONS

This application claims priority to Chinese Patent Application No. 2024118576654, titled "METHOD FOR LITHIUM EXTRACTION BY LEACHING FROM SPODUMENE" and filed with the China National Intellectual Property Administration on Dec. 17, 2024, and priority to Chinese Patent Application No. 2025108609694, titled "METHOD FOR DESULFURIZATION FROM SPODUMENE SMELTING SLAG" and filed with the China National Intellectual Property Administration on Jun. 25, 2025, the entire contents of which are incorporated herein by reference.

TECHNICAL FIELD

The present disclosure relates to the field of resource utilization of lithium ore, and more specifically to a method for lithium extraction by leaching from spodumene and desulfurization.

BACKGROUND

Spodumene smelting slag is the solid waste generated after lithium extraction from spodumene. Common acid-based lithium extraction slag is the waste slag generated during the production of lithium salts via the sulfuric acid method. That is, it is the waste slag generated after lithium ore undergoes processes including high-temperature roasting, acid baking, atmospheric pressure water leaching, and solid-liquid separation. Its main components are aluminosilicates, quartz, and gypsum. According to statistics, extracting lithium from spodumene produces approximately 8 to 10 tons of lithium slag per ton of lithium carbonate produced (CN118847346A). Most of the lithium slag is disposed of through stacking or landfilling, which not only wastes resources but also poses risks of environmental pollution. At present, the primary resource utilization pathways for the spodumene smelting slag are concentrated in traditional building materials industries, such as low-value-added products like concrete, ceramic aggregates, and baking-free bricks, etc. However, in these applications, valuable metal elements (such as residual lithium, tantalum, and niobium) as well as the gypsum component in the lithium slag have not been effectively recovered or utilized for high-value purposes. With the rapid increase in the amount of the lithium slag, the building materials industry has reached near saturation in its capacity to absorb the lithium slag. Consequently, the high-value utilization of the spodumene smelting slag has become an urgent priority, and removing the gypsum from the lithium slag and reducing its sulfur content are prerequisites for the large-scale utilization in building materials. At present, existing desulfurization methods suffer from significant problems such as low separation efficiency, high cost of reagents, limited reagent variety, and complex operations, making it difficult to meet the demands of industrial-scale processing.

Therefore, there is an urgent need to develop a desulfurization method that exhibits high desulfurization efficiency and a simple process flow.

SUMMARY

The present disclosure provide a method for lithium extraction by leaching from spodumene and desulfurization, which achieves high desulfurization efficiency and a simple process flow, enables deep separation of gypsum from silicates in lithium slag, thereby providing a raw material basis for subsequent production of a high-value-added hemihydrate gypsum product and high-quality aluminum-silicon powder, and providing an efficient technical approach for the resource utilization of spodumene smelting slag.

In a first aspect, the present disclosure provides a method for lithium extraction by leaching from spodumene and desulfurization, including:

- extracting lithium by leaching from spodumene to obtain lithium leaching solution and spodumene smelting slag; and
- performing desulfurization on the spodumene smelting slag to obtain a gypsum product and desulfurized lithium slag;
- wherein the desulfurization comprises:
- S21, mixing the spodumene smelting slag with water, and adjusting a pH value to 8-12.5 to prepare a mineral slurry;
- S22, adding a conditioning agent to the mineral slurry for conditioning to obtain slurry 1; wherein the conditioning agent includes sodium silicate, sodium citrate, and ethylenediaminetetra(methylenephosphonic acid) sodium salt; and
- S23, adding a collecting agent to slurry 1, performing flotation desulfurization, followed by filtration and drying, to obtain the gypsum product and the desulfurized lithium slag.

The present disclosure further subjects the desulfurized lithium slag, obtained after leaching lithium from spodumene, to an additional desulfurization treatment, which enables deep separation of the gypsum from the silicates in the lithium slag, thereby providing the raw material basis for subsequent production of the high-value-added hemihydrate gypsum product and the high-quality aluminum-silicon powder, and providing an efficient technical approach for the resource utilization of the spodumene smelting slag.

In some embodiments, in step S21, the spodumene smelting slag includes 5.79%-6.06% of CaO, 6.03%-6.70% of $SO_3$, and 58.64%-61.06% of $SiO_2$.

In some embodiments, in step S21, a mass concentration of the mineral slurry ranges from 27% to 33%.

In some embodiments, in step S21, adjusting the pH value to 8-12.5 includes adding a pH conditioning agent to the mineral slurry formed by mixing the spodumene smelting slag with water, and the pH conditioning agent includes at least one of NaOH, $Na_2CO_3$, $Ca(OH)_2$, CaO, $K_2CO_3$, or $CaCO_3$. It should be understood that the pH conditioning agent includes but is not limited to the above-mentioned alkaline conditioning agents, other alkaline conditioning agents known in the art may also be employed, so long as they can adjust the pH value to 8-12.5.

In some embodiments, in step S22, a mass ratio of sodium silicate, sodium citrate, and ethylenediaminetetra(methylenephosphonic acid) sodium salt is (10-40):(1-10):1.

In some embodiments, in step S23, the collecting agent includes at least one of dodecylamine, cetyltrimethylammonium bromide, sodium petroleum sulfonate, or sodium oleate.

In some embodiments, the collecting agent is dodecylamine and sodium petroleum sulfonate; a mass ratio of dodecylamine and sodium petroleum sulfonate is (2-10):1.

In some embodiments, in step S23, the flotation desulfurization includes one roughing, one cleaning, and two to three scavengings.

In some embodiments, during the roughing, a total amount of the collecting agent ranges from 50 g/t to 100 g/t;

during the cleaning, the pH of the mineral slurry is adjusted to 9-11 with the pH conditioning agent; and during the scavengings, a total dosage of the collecting agent ranges from 100 g/t to 150 g/t.

In some embodiments, a purity of the gypsum product is greater than 90%; and an $SO_3$ content of the desulfurized lithium slag is less than 1%.

In some embodiments, the extracting lithium by leaching includes:

roasting a mixture of spodumene concentrate and a roasting aid to obtain a calcined clinker; acid-leaching the calcined clinker under application of an external field, followed by solid-liquid separation, to obtain the lithium leaching solution and the spodumene smelting slag.

In some embodiments, the roasting aid includes any one or a combination of at least two of fluorides, sodium salts, or potassium salts. Preferably, the roasting aid includes any one or a combination of at least two of potassium fluoride, sodium fluoride, sodium sulfate, potassium sulfate, sodium carbonate, potassium carbonate, sodium acetate, potassium acetate, sodium chloride, potassium chloride, sodium nitrate, or potassium nitrate.

In some embodiments, a mass ratio of the spodumene concentrate and the roasting aid is (1-10):1.

Preferably, a mixing method of the spodumene concentrate and the roasting aid includes any one or a combination of at least two of mechanical stirring, rotary stirring, or ball milling.

In some embodiments, a temperature for the roasting ranges from 750° C. to 1000° C., preferably ranges from 750° C. to 850° C.

Preferably, a time for the roasting ranges from 10 min to 60 min.

In some embodiments, the external field includes any one or a combination of at least two of electrochemical field and/or ultrasonic field.

In some embodiments, the acid-leaching includes mixing the calcined clinker with an acid solution to obtain an acid-leached slurry;

preferably, in the acid-leached slurry, a solid-liquid ratio of the calcined clinker and the acid solution ranges from 2 mL/g to 10 mL/g.

In some embodiments, a time for the acid-leaching ranges from 30 min to 90 min;

preferably, a temperature for the acid-leaching ranges from 20° C. to 95° C.

In some embodiments, the acid solution includes any one or a combination of at least two of sulfuric acid, hydrochloric acid, nitric acid, or phosphoric acid.

Preferably, a concentration of the acid solution ranges from 2 wt % to 30 wt %.

In some embodiments, the method further includes water washing the spodumene smelting slag obtained after solid-liquid separation.

In some embodiments, in the water washing process, a solid-liquid ratio of the spodumene smelting slag and the water ranges from 2 mL/g to 10 mL/g.

Preferably, a temperature for the water washing ranges from 20° C. to 70° C.

Preferably, water washing methods include single-stage washing and/or multi-stage countercurrent washing.

In a second aspect, the present disclosure provides a method for desulfurization from spodumene smelting slag, including:

S21, mixing spodumene smelting slag with water, and adjusting a pH value to 8-12.5 to prepare a mineral slurry;

S22, adding a conditioning agent to the mineral slurry for conditioning to obtain slurry 1; wherein the conditioning agent includes sodium silicate, sodium citrate, and ethylenediaminetetra(methylenephosphonic acid) sodium salt; and

S23, adding a collecting agent to slurry 1, performing flotation desulfurization, followed by filtration and drying, to obtain a gypsum product and desulfurized lithium slag.

By adopting the above-mentioned technical solutions, the desulfurization method provided in the present disclosure achieves high desulfurization efficiency and a simple process flow, enables deep separation of gypsum from silicates in lithium slag. The pH value is adjusted to 8-12.5 in step S21 of the present disclosure. This is because an alkaline environment not only facilitates the uniform dispersion of mineral particles in water but also provides suitable conditions for subsequent chemical reactions. In step S22, under alkaline environment, adding the conditioning agent composed of sodium silicate, sodium citrate, and ethylenediaminetetra(methylenephosphonic acid) sodium salt enables complexation with metal cations in the silicate mineral lattice. This effectively suppresses the flotation of the silicates, allowing the gypsum to become the primary froth product, thereby achieving efficient flotation desulfurization from the lithium slag. In step S23, adding the collecting agent selectively enhances the hydrophobicity of the gypsum, facilitating its flotation and enabling deep separation of the gypsum from the silicates.

The present disclosure employs a specific composition of the conditioning agent under the specific alkaline condition, significantly enhancing the selectivity and efficiency of the flotation, and the entire process is simple and easy to operate, requires no complex pretreatment or post-treatment steps, and holds promising prospects for industrial application. The method provided in the present disclosure exhibits high desulfurization efficiency, utilizes a diverse range of reagents, and demonstrates strong adaptability. It solves problems such as low separation efficiency and limited reagent variety and the like present in conventional desulfurization methods, thereby offering an efficient technical approach for the resource utilization of the spodumene smelting slag.

Optionally, in step S21, the spodumene smelting slag includes 5.79%-6.06% of CaO, 6.03%-6.70% of $SO_3$, and 58.64%-61.06% of $SiO_2$.

By adopting the above-mentioned technical solutions, the specific chemical composition of the spodumene smelting slag within the present disclosure provides a favorable mineral foundation for the flotation, facilitating the deep separation of the gypsum and the silicates through the flotation method.

Optionally, in step S21, the pH value is adjusted to 8-11.

Optionally, in step S21, a mass concentration of the mineral slurry ranges from 27% to 33%.

By adopting the above-mentioned technical solutions, the mass concentration of the mineral slurry in the present disclosure ensures good dispersion of mineral particles, enhances flotation efficiency, and facilitates control of reagent dosage to prevent waste and reduce costs.

Optionally, in step S21, adjusting the pH value to 8-12.5 includes adding a pH conditioning agent to the mineral slurry formed by mixing the spodumene smelting slag with water, and the pH conditioning agent includes at least one of $NaOH$, $Na_2CO_3$, $Ca(OH)_2$, $CaO$, $K_2CO_3$, or $CaCO_3$. It should be understood that the pH conditioning agent includes but is not limited to the above-mentioned alkaline agents, other alkaline conditioning agents known in the art may also be employed, so long as they can adjust the pH value to 8-12.5.

By adopting the above-mentioned technical solutions, the pH conditioning agent of the present disclosure enables precise control of the pH value, effectively supports the entire flotation desulfurization process, ensures efficient separation between the gypsum and silicate minerals, and consequently yields a high-purity gypsum product and the desulfurized lithium slag with low sulfur content, thereby providing a foundation for the subsequent production of high-value-added products.

Optionally, in step S22, a mass ratio of sodium silicate, sodium citrate, and ethylenediaminetetra(methylenephosphonic acid) sodium salt is (10-40):(1-10):1.

By adopting the above-mentioned technical solutions, the specific mass ratio of sodium silicate, sodium citrate, and ethylenediaminetetra(methylenephosphonic acid) sodium salt in the present disclosure achieves an optimal inhibitory effect on the silicate minerals, thereby enhancing the selective recovery rate of the gypsum and ensuring to acquire a high-quality gypsum product and the desulfurized lithium slag having low sulfur content. At the same time, by flexibly adjusting the ratio of the three components, the process method of the present disclosure can be adapted to a wider variety of the mineral slurry, thereby enhancing the flexibility and applicability of the process.

Optionally, in step S23, the collecting agent includes at least one of dodecylamine, cetyltrimethylammonium bromide, sodium petroleum sulfonate, or sodium oleate.

By adopting the above-mentioned technical solutions, the collecting agent of the present disclosure effectively enhances the hydrophobicity of the gypsum particles, promotes their attachment to air bubbles and subsequent flotation, thereby achieving efficient flotation and enabling deep separation of the gypsum from the silicate minerals.

Optionally, the collecting agent is dodecylamine and sodium petroleum sulfonate; a mass ratio of dodecylamine and sodium petroleum sulfonate is (2-10):1.

By adopting the above-mentioned technical solutions, the present disclosure provides the dodecylamine and the sodium petroleum sulfonate as a compound collecting agent system, which leverages both the synergistic actions. This system not only enhances the hydrophobicity of the gypsum but also exhibits excellent dispersing properties, helping to prevent the agglomeration of fine mineral particles and thereby improving the flotation efficiency. The specific mass ratio of dodecylamine and sodium petroleum sulfonate achieves the best flotation efficiency while preventing excessive dosage that could cause non-target minerals to float.

Optionally, in step S23, the flotation desulfurization includes one roughing, one cleaning, and two to three scavengings.

By adopting the above-mentioned technical solutions, the method of the present disclosure achieves efficient separation of the gypsum from the silicate minerals by controlling parameters at each step, simplifies the process, requires only one cleaning to attain the desired separation effect, enhances processing efficiency, reduces energy consumption and reagent usage, thereby lowering overall costs. Two to three scavengings maximize resource recovery, minimize resource waste and waste emissions.

Optionally, during the roughing, a total dosage of the collecting agent ranges from 50 g/t to 100 g/t; during the cleaning, the pH of the mineral slurry is adjusted to 9-11 with the pH conditioning agent; and during the scavengings, a total dosage of the collecting agent ranges from 100 g/t to 150 g/t.

By adopting the above-mentioned technical solutions, during the roughing of the present disclosure, controlling the dosage of the collecting agent promotes effective flotation of target minerals, ensures deep separation of the gypsum, and simultaneously prevents excessive use that could lead to unintended collection of non-target minerals, thereby balancing economic and environmental requirements.

During the cleaning of the present disclosure, controlling the pH value of the mineral slurry further enhances the suppression effect on the silicate minerals, effectively inhibiting their flotation.

During the scavengings of the present disclosure, controlling the dosage of the collecting agent enables effective recovery of the gypsum while preventing non-selective flotation of the non-target minerals, reducing reagent consumption and environmental impact, and simultaneously improving the overall economic efficiency of the flotation operation.

Optionally, a purity of the gypsum product is greater than 90%; and an $SO_3$ content of the desulfurized lithium slag is less than 1%.

By adopting the above-mentioned technical solutions, the present disclosure enables to achieve the efficient separation of the gypsum from the silicate minerals, ultimately yielding high-purity gypsum products (with $CaSO_4$ content greater than 90%) that serve as raw materials for producing the high-value-added hemihydrate gypsum; at the same time, the $SO_3$ content in the desulfurized lithium slag is reduced to less than 1%, enabling its use in the production of high-value-added aluminum-silicon powder. This significantly enhances the resource utilization rate of the spodumene smelting slag, reduces the risk of environmental pollution, and demonstrates substantial potential for industrial application.

Compared with the prior arts, the beneficial effects of the present disclosure are at least:

1. The desulfurization method provided in the present disclosure achieves high desulfurization efficiency and the simple process flow, enables deep separation of the gypsum from the silicates in the lithium slag.

2. The present disclosure employs the specific composition of the conditioning agent under the specific alkaline condition, significantly enhancing the selectivity and efficiency of the flotation, and the entire process is simple and easy to operate, requires no complex pretreatment or post-treatment steps, and demonstrates promising prospects for industrial application.

3. The present disclosure enables to achieve the efficient separation of the gypsum from the silicate minerals, ultimately yielding the high-purity gypsum products (with $CaSO_4$ content greater than 90%) that serve as raw materials for producing the high-value-added hemihydrate gypsum; at the same time, the $SO_3$ content in the desulfurized lithium slag is reduced to less than 1%, enabling its use in the production of the high-value-added aluminum-silicon powder. This significantly enhances the resource utilization rate of the spodumene smelting slag, reduces the risk of environmental pollution.

In a third aspect, the present disclosure provides a method for lithium extraction by leaching from spodumene, including:

roasting a mixture of spodumene concentrate and a roasting aid to obtain a calcined clinker; acid-leaching the calcined clinker under application of an external field, followed by solid-liquid separation, to obtain lithium leaching solution and spodumene smelting slag.

The present disclosure analyzes the mineralogical structure of the spodumene and, in conjunction with the ternary phase diagram of $Al_2O_3$—$SiO_2$-MeO (where Me represents K, Na, Ca, etc.), and introduces the roasting aid that disrupts the bonding state between lithium and other elements in the spodumene, enabling efficient mineral phase restructuring without requiring high-temperature phase transformation roasting. This process effectively activates the lithium-bearing mineral phases in the spodumene, thereby enhancing the reactivity of inert Li therein. Furthermore, under a synergistic effect of an external field, efficient leaching of lithium from the spodumene is achieved, shortening the lithium extraction leaching process, reducing the consumption of reagents, and realizing concurrent economic and environmental benefits. Moreover, desulfurizing the obtained spodumene smelting slag enables deep separation of the gypsum from the silicates in the lithium slag, thereby providing the raw material basis for subsequent production of the high-value-added hemihydrate gypsum product and the high-quality aluminum-silicon powder, and providing an efficient technical approach for the resource utilization of valuable components in the spodumene.

In some embodiments, the roasting aid includes any one or a combination of at least two of fluorides, sodium salts, or potassium salts.

In some embodiments, the roasting aid includes any one or a combination of at least two of potassium fluoride, sodium fluoride, sodium sulfate, potassium sulfate, sodium carbonate, potassium carbonate, sodium acetate, potassium acetate, sodium chloride, potassium chloride, sodium nitrate, or potassium nitrate, typical but non-limiting combinations include potassium fluoride and sodium fluoride, sodium sulfate and potassium sulfate, sodium carbonate and potassium carbonate, sodium acetate and potassium acetate, sodium chloride and potassium chloride, sodium nitrate and potassium nitrate, or sodium fluoride and sodium sulfate.

A mass ratio of the spodumene concentrate and the roasting aid may affect a temperature of roasting and a leaching rate of lithium. If an excessive amount of the roasting aid is used, although it can effectively reduce the temperature of roasting and improve the leaching rate of the lithium, the excessive amount of the roasting aid leads to high production costs. Conversely, if an insufficient amount of the roasting aid is used, the temperature of roasting cannot be reduced, and the transformation of the mineral structure of the spodumene cannot be effectively achieved, resulting in low leaching rate of the lithium.

Preferably, the mass ratio of the spodumene concentrate and the roasting aid is (10:1):1, for example, it can be 1:1, 2:1, 3:1, 4:1, 5:1, 6:1, 7:1, 8:1, 9:1 or 10:1, including but not limited to the values listed, other values within the specified range that are not listed are also applicable.

Preferably, a mixing method of the spodumene concentrate and the roasting aid includes any one or a combination of at least two of mechanical stirring, rotation, or ball milling.

In the present disclosure, during the mixing of the spodumene concentrate and the roasting aid, the sufficient contact between the roasting aid and the spodumene, coupled with the integration of mechanical and chemical fields, reduces the mass transfer resistance between the roasting aid and the spodumene, intensifies the solid-solid mass transfer process, and promotes the disruption of the bonding state between lithium and other elements in the spodumene by the roasting aid. Without the need for high-temperature phase transformation roasting, efficient mineral phase reconstruction of the spodumene is achieved, effectively activating the lithium-bearing mineral phases in the spodumene and thereby enhancing the reactivity of inert lithium therein.

Preferably, the temperature of roasting ranges from 750° C. to 1000° C., for example, it can be 750° C., 800° C., 850° C., 900° C., 950° C. or 1000° C., including but not limited to the values listed, other values within the specified range that are not listed are also applicable, with a preferred range of 750° C. to 850° C.

Preferably, a time of roasting ranges from 10 min to 60 min, for example, it can be 10 min, 15 min, 20 min, 25 min, 30 min, 35 min, 40 min, 45 min, 50 min, 55 min or 60 min, including but not limited to the values listed, other values within the specified range that are not listed are also applicable.

Preferably, the external field includes electrochemical field and/or ultrasonic field.

In the present disclosure, the electrochemical field refers to the application of an electric field during leaching the spodumene concentrate, where the bonding state between lithium and other elements has been disrupted by the roasting aid. The electrochemical field promotes electron transfer and alters reaction pathways, thereby significantly reducing the leaching potential and achieving the efficient lithium extraction.

In the present disclosure, the ultrasonic field refers to the application of the ultrasonic field during the leaching process, utilizing its cavitation effect to intensify the leaching of the spodumene and achieve the efficient lithium extraction.

Preferably, the acid-leaching process includes mixing the calcined clinker with the acid solution to obtain the acid-leached slurry.

Preferably, in the acid-leached slurry, a solid-liquid ratio of the calcined clinker and the acid solution ranges from 2 mL/g to 10 mL/g, for example, it can be 2 mL/g, 3 mL/g, 4 mL/g, 5 mL/g, 6 mL/g, 7 mL/g, 8 mL/g, 9 mL/g or 10 mL/g, including but not limited to the values listed, other values within the specified range that are not listed are also applicable.

Preferably, a time of the acid-leaching ranges from 30 min to 90 min, for example, it can be 30 min, 40 min, 50 min, 60 min, 70 min, 80 min or 90 min, including but not limited to the values listed, other values within the specified range that are not listed are also applicable.

Preferably, a temperature of the acid-leaching ranges from 20° C. to 95° C., for example, it can be 20° C., 30° C., 40° C., 50° C., 60° C., 70° C., 80° C., 90° C. or 95° C., including but not limited to the values listed, other values within the specified range that are not listed are also applicable.

Preferably, the acid solution includes any one or a combination of at least two of sulfuric acid, hydrochloric acid, nitric acid, or phosphoric acid.

Preferably, a concentration of the acid solution ranges from 2 wt % to 30 wt %, for example, it can be 2 wt %, 4 wt %, 6 wt %, 8 wt %, 10 wt %, 12 wt %, 14 wt %, 16 wt %, 18 wt %, 20 wt %, 22 wt %, 24 wt %, 26 wt %, 28 wt % or 30 wt %, including but not limited to the values listed, other values within the specified range that are not listed are also applicable.

Preferably, the method further includes water washing the spodumene smelting slag obtained after solid-liquid separation.

Preferably, in the water washing process, a solid-liquid ratio of the spodumene smelting slag and water ranges from 2 mL/g to 10 mL/g, for example, it can be 2 mL/g, 3 mL/g, 4 mL/g, 5 mL/g, 6 mL/g, 7 mL/g, 8 mL/g, 9 mL/g or 10 mL/g, including but not limited to the values listed, other values within the specified range that are not listed are also applicable.

Preferably, a temperature of the water washing ranges from 20° C. to 70° C., for example, it can be 20° C., 25° C., 30° C., 35° C., 40° C., 45° C., 50° C., 55° C., 60° C., 65° C. or 70° C., including but not limited to the values listed, other values within the specified range that are not listed are also applicable.

Preferably, water washing methods include single-stage washing and/or multi-stage countercurrent washing.

In the present disclosure, the single-stage washing refers to the process of washing the filter residue after solid-liquid separation of the leached slurry, with the wash water being returned to the leaching process.

In the present disclosure, the multi-stage countercurrent washing refers to the process wherein, after solid-liquid separation of the leached slurry, the solid material undergoes countercurrent washing, the wash liquor is then returned to the preceding stage for washing the solid residue, and so on, thereby fully utilizing the wash liquor, with fresh water being used for washing in the final stage.

In the present disclosure, the wash water obtained after washing the spodumene smelting slag is recycled. The lithium-rich solution is further purified and separated for the production of lithium-based products, while the spodumene leaching residue is used to produce aluminum-silicon series products.

Compared with the prior arts, the beneficial effects of the present disclosure are at least:

In the present disclosure, a process route combining one-step roasting-aid phase transformation with external field intensified leaching for lithium extraction is provided by introducing the roasting aid combined with external field intensification. The roasting aid is used to disrupt the bonding state between the lithium and other elements in the spodumene, effectively activating the lithium-bearing mineral phases in the spodumene without requiring high-temperature phase transformation roasting, thereby enhancing the reactivity of inert Li therein, and enabling efficient mineral phase restructuring of the spodumene. Furthermore, under a synergistic effect of an external field, efficient leaching of the lithium from the spodumene is achieved, shortening the lithium extraction leaching process, reducing the consumption of reagents, and realizing concurrent economic and environmental benefits.

DESCRIPTION OF THE DRAWINGS

To describe the technical solutions in the examples of the present disclosure more clearly, the accompanying drawings used in describing the examples are briefly introduced below. Apparently, the accompanying drawings described below are merely some examples of the present disclosure. Other drawings can be obtained from these accompanying drawings by those of ordinary skills in the art without creative efforts.

DETAILED DESCRIPTION

Figure 1A:
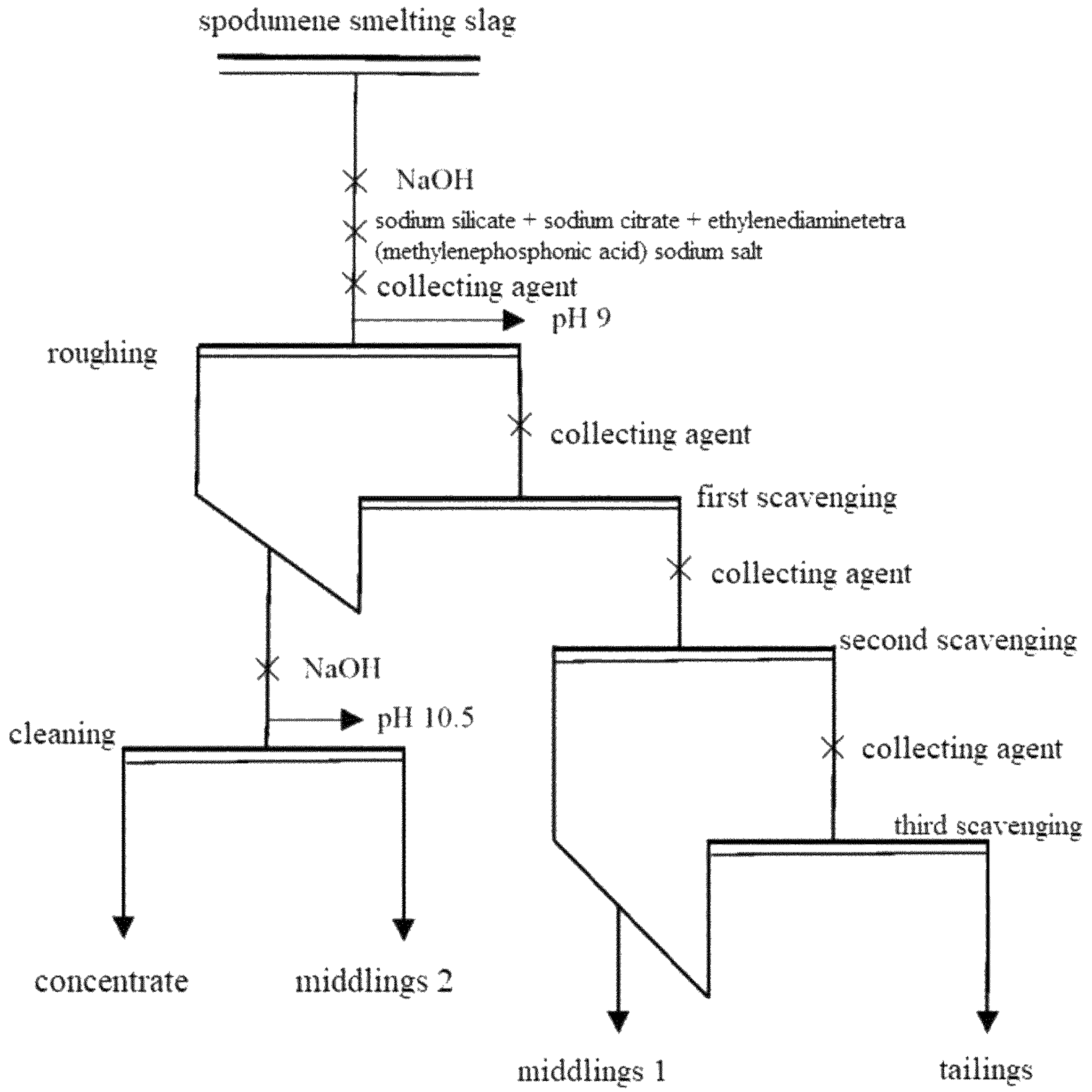
FIG. 1A is a process flowchart of a method for desulfurization of spodumene smelting slag according to Example 1A of the present disclosure.

To make the objectives, technical solutions, and advantages of the present disclosure clearer, the following further describes the embodiments of the present disclosure in detail with reference to the accompanying drawings. Obviously, the described embodiments are merely some embodiments rather than all the embodiments of the present disclosure. Based on the embodiments in the present disclosure, all other embodiments obtained by those of ordinary skills in the art without paying creative efforts belong to the protection scope of the present disclosure.

Unless otherwise defined, all technical and scientific terms used in the present disclosure have the same meaning as commonly understood by those of ordinary skills in the art belonging to the technical field of the present disclosure; the terms used in specification of the present disclosure are intended only for the purpose of describing specific embodiments and are not intended to limit the present disclosure; the terms "comprise" and "include" and any variations thereof in the specification and the claims of the present disclosure and in the brief description of drawings above are intended to cover non-exclusive inclusion. The terms "first", "second" and the like in the specification and claims of the present disclosure or in the above drawings are used for distinguishing between different objects rather than describing a particular order or a primary-secondary relationship.

In the present disclosure, "embodiment" mentioned means that the specific features, structures and characteristics described in conjunction with the embodiments may be included in at least one embodiment of the present disclosure. This term appearing in various parts of the specification does not necessarily refer to the same embodiment, nor an independent or alternative embodiment that is mutually exclusive to other embodiments.

The terms "and/or" in the present disclosure describes the association relationship between associated objects, indicating that there may be three relationships. For example, A and/or B means that there are three cases: only A, both A and B, and only B. The character "/" generally indicates that an association relationship between the associated objects is an "or" relationship.

To clearly illustrate the technical solution of the present disclosure, in the detailed description, the primary phases of spodumene concentrate are α-$LiAlSi_2O_6$, albite, quartz, and muscovite, with a lithium oxide grade of 5.81%. Main elements are silicon and aluminum, accounting for 54.85% and 17.85%, respectively.

The foregoing description is provided solely for the purpose of clearly illustrating the technical solutions of the present disclosure and shall not be construed as further limiting the scope of the present disclosure.

Flotation is a separation process that utilizes differences in the physical and chemical properties between target minerals and gangue minerals on their surfaces. It offers advantages such as low cost and high efficiency, making it a vital mineral processing technology. CN116532235A discloses a method for the comprehensive resource utilization of spodumene smelting slag, including pulping, ore grinding, leaching, slurry conditioning, flotation, magnetic separation, gravity separation, and weak magnetic separation, to recover various components from the spodumene smelting slag. This method employs flotation desulfurization by adjusting a pH value of mineral slurry to 6-7, adding conditioning agents such as sodium silicate, sodium hexametaphosphate, or CMC, and utilizing an anionic composite collecting agent. After undergoing one roughing, three scavengings, and two cleanings, the froth product is concentrated and filtered to obtain gypsum product. This method requires two cleanings to obtain the gypsum product with an $SO_3$ content greater than 40%, consumes a significant amount of reagent (with composite collecting agent greater than 400 g/t, and conditioning agent of 200-3000 g/t), and suffers from low separation efficiency and an unreasonable reagent regime. CN114226413A, CN113976309A, and CN118847346A and the like disclose flotation desulfurization methods for lithium slag. However, the conditioning agents used in these methods are relatively limited in variety, predominantly employing sodium silicate, CMC, etc. When using fatty acid composite collecting agents, cleaning are required to perform twice or three times to obtain the gypsum product with $SO_3$ content greater than 40%.

In summary, while existing lithium slag flotation desulfurization methods achieve separation of the gypsum from other minerals to some extent, they suffer from significant problems such as low separation efficiency and reliance on a single type of reagent.

To solve the above-mentioned problem, the present disclosure provides a method for desulfurization from spodumene smelting slag, including:

S21, mixing spodumene smelting slag with water, and adjusting a pH value to 8-12.5 to prepare a mineral slurry;

S22, adding a conditioning agent to a mineral slurry for conditioning to obtain slurry 1; wherein the conditioning agent includes sodium silicate, sodium citrate, and ethylenediaminetetra(methylenephosphonic acid) sodium salt;

S23, adding a collecting agent to slurry 1, performing flotation desulfurization, followed by filtration and drying, to obtain a gypsum product and desulfurized lithium slag. The inventor discovered: under alkaline conditions, adding a conditioning agent composed of the sodium silicate, the sodium citrate, and the ethylenediaminetetra(methylenephosphonic acid) sodium salt enables complexation with metal cations in the silicate mineral lattice. This effectively suppresses the flotation of silicates, allowing the gypsum to become the primary froth product, thereby achieving efficient flotation desulfurization from the lithium slag.

In some embodiments, in step S21, the spodumene smelting slag includes 5.79%-6.06% of CaO, 6.03%-6.70% of $SO_3$, and 58.64%-61.06% of $SiO_2$. Controlling the composition of the spodumene smelting slag in the present disclosure, enables deep separation of the gypsum from silicates.

In some embodiments, in step S21, a pH value is adjusted to 8-11. Controlling the pH value in the present disclosure further improves the flotation desulfurization efficiency.

In some embodiments, in step S21, a mass concentration of the mineral slurry ranges from 27% to 33%. Controlling the mass concentration of the mineral slurry in the present disclosure, further improves the flotation desulfurization efficiency.

In some embodiments, in step S21, adjusting the pH value to 8-12.5 includes: adding a pH conditioning agent to the mineral slurry formed by mixing the spodumene smelting slag with water, the pH conditioning agent is selected from NaOH or CaO. Controlling the pH value of the mineral slurry and selection of the pH conditioning agent in the present disclosure, further improve the flotation desulfurization efficiency.

In some embodiments, in step S22, a mass ratio of the sodium silicate, the sodium citrate, and the ethylenediaminetetra(methylenephosphonic acid) sodium salt is (10-40):(1-10):1. Controlling the mass ratio of the sodium silicate, the sodium citrate, and the ethylenediaminetetra(methylenephosphonic acid) sodium salt in the present disclosure, further improves the flotation desulfurization efficiency, inhibits the flotation of the silicate minerals.

In some embodiments, in step S23, the collecting agent includes at least one of dodecylamine, cetyltrimethylammonium bromide, sodium petroleum sulfonate, or sodium oleate. Selection of the collecting agent in the present disclosure further improves the flotation desulfurization efficiency.

In some embodiments, the collecting agent is the dodecylamine and the sodium petroleum sulfonate. Combination of the collecting agents in the present disclosure further improves the flotation desulfurization efficiency.

In some embodiments, a mass ratio of the dodecylamine and the sodium petroleum sulfonate is (2-10):1. Controlling the mass concentration of the dodecylamine and the sodium petroleum sulfonate in the present disclosure further improves the flotation desulfurization efficiency.

In some embodiments, in step S23, the flotation desulfurization includes one roughing, one cleaning, and two to three scavengings. The present disclosure controls the process flow of the flotation desulfurization operation, simplifies the process, improves treatment efficiency, and reduces costs.

In some embodiments, during the roughing, a total dosage of the collecting agent ranges from 50 g/t to 100 g/t. Controlling a dosage of the collecting agents used in the roughing in the present disclosure further improves the flotation desulfurization efficiency, while suppressing the flotation of non-target minerals.

In some embodiments, during the cleaning, using the pH conditioning agent to adjust the pH of the mineral slurry to 9-11. Controlling the pH value of the present disclosure during the cleaning, further improves the flotation desulfurization efficiency.

In some embodiments, during the scavengings, a total dosage of the collecting agent ranges from 100 g/t to 150 g/t. Controlling the dosage of the collecting agents used in the scavenging stage in the present disclosure further improves the recovery rate of gypsum, while avoiding the flotation of non-target minerals.

In some embodiments, a purity of the gypsum product is greater than 90%; and an $SO_3$ content of the desulfurized lithium slag is less than 1%. The purity of the gypsum products and the $SO_3$ content of the desulfurized lithium slag in the present disclosure significantly enhance the resource utilization rate of the spodumene smelting slag.

The solutions of the present disclosure are described below with reference to the following specific examples. Unless otherwise specified, all raw materials used in the following examples are commercially available products, and all apparatuses or equipment are purchased through conventional commercial channels.

Example 1A

This example provides a method for desulfurization from spodumene smelting slag, including:

- S21, weighing 500 g of the spodumene smelting slag from a Jiangxi-based company into a 1.5 L flotation cell and adding water to mix, adjusting a concentration of a mineral slurry to 27%, and then stirring for 5 min; adding 3.2 kg/t NaOH and stirring for 5 min, at this time, a pH value is 9.2, and the mineral slurry is obtained; wherein the spodumene smelting slag includes 5.79% of CaO, 6.22% of $SO_3$, and 60.12% of $SiO_2$;
- S22, adding 1000 g/t sodium silicate, 100 g/t sodium citrate and 100 g/t ethylenediaminetetra(methylenephosphonic acid) sodium salt to the mineral slurry, and then stirring for 5 min, then slurry 1 is obtained;
- S23, adding 50 g/t collecting agent to slurry 1 and stirring for 5 min to conduct roughing, at this time, the pH value of the mineral slurry is 9; then conducting three scavengings, and adding 50 g/t collecting agent to each of the three scavengings, then the tailings from the scavengings are filtered and dried to obtain desulfurized lithium slag.

A froth product from the roughing and the first scavenging are combined, and then transferred to a 0.75 L flotation cell, adding 0.2 kg/t NaOH, stirring for 3 min, at this time, the pH value of the mineral slurry is 10.5. Then conducting cleaning, and the concentrate obtained after cleaning is filtered and dried to yield a gypsum product; wherein the collecting agent is dodecylamine.

The flotation desulfurization results for Example 1A are shown in Table 1.

TABLE 1

| Experiment | | | Grade % | | | Recovery Rate % | | |
|---|---|---|---|---|---|---|---|---|
| Condition | Product Name | Yield % | CaO | $SO_3$ | $SiO_2$ | CaO | $SO_3$ | $SiO_2$ |
| Example 1A | Concentrate | 7.78 | 37.18 | 53.30 | 5.62 | 49.95 | 66.62 | 0.73 |
| | Middlings 2 | 3.43 | 10.64 | 16.37 | 47.79 | 6.30 | 9.01 | 2.72 |
| | Concentrate + Middlings 2 | 11.21 | 29.06 | 42.01 | 18.51 | 56.25 | 75.64 | 3.45 |
| | Middlings 1 | 3.52 | 14.56 | 19.58 | 43.16 | 8.85 | 11.07 | 2.53 |
| | Concentrate + Middlings 2 + Middlings 1 | 14.72 | 25.60 | 36.65 | 24.40 | 65.10 | 86.71 | 5.98 |
| | Tailings | 85.28 | 2.37 | 0.97 | 66.29 | 34.90 | 13.29 | 94.02 |
| | Feed | 100.00 | 5.79 | 6.22 | 60.12 | 100.00 | 100.00 | 100.00 |

Example 2A

This example provides a method for desulfurization from spodumene smelting slag, including:

S21, weighing 500 g of the spodumene smelting slag from a Jiangxi-based company into a 1.5 L flotation cell and adding water to mix, adjusting a concentration of a mineral slurry to 33%, and then stirring for 5 min; adding 8 kg/t CaO and stirring for 5 min, at this time, a pH value is 12.5, and the mineral slurry is obtained; wherein the spodumene smelting slag includes 5.85% of CaO, 6.03% of $SO_3$, and 61.06% of $SiO_2$;

S22, adding 2000 g/t sodium silicate, 500 g/t sodium citrate and 50 g/t ethylenediaminetetra(methylenephosphonic acid) sodium salt to the mineral slurry, and then stirring for 5 min, then slurry 1 is obtained;

S23, adding 50 g/t collecting agent to slurry 1 and stirring for 5 min to conduct roughing, at this time, the pH value of the mineral slurry is 12.2; then conducting two scavengings, and adding 50 g/t collecting agent to each of the two scavengings, then the tailings from the scavengings are filtered and dried to obtain desulfurized lithium slag; a froth product from the roughing and the first scavenging are combined, and then transferred to a 0.75 L flotation cell, adding 0.4 kg/t NaOH, stirring for 3 min, at this time, the pH value of the mineral slurry is 11. Then conducting cleaning, and the concentrate obtained after cleaning is filtered and dried to yield a gypsum product; wherein the collecting agent is dodecylamine.

The flotation desulfurization results for Example 2A are shown in Table 2.

TABLE 2

| Experiment | | | Grade % | | | Recovery Rate % | | |
|---|---|---|---|---|---|---|---|---|
| Condition | Product Name | Yield % | CaO | $SO_3$ | $SiO_2$ | CaO | $SO_3$ | $SiO_2$ |
| Example 2A | Concentrate | 7.15 | 39.40 | 53.90 | 4.09 | 48.11 | 63.85 | 0.48 |
| | Middlings 2 | 3.16 | 11.63 | 16.28 | 47.33 | 6.27 | 8.52 | 2.45 |
| | Concentrate + Middlings 2 | 10.30 | 30.89 | 42.38 | 17.33 | 54.39 | 72.36 | 2.93 |
| | Middlings 1 | 3.81 | 17.12 | 23.51 | 38.28 | 11.13 | 14.83 | 2.39 |
| | Concentrate + Middlings 2 + Middlings 1 | 14.11 | 27.18 | 37.29 | 22.98 | 65.52 | 87.19 | 5.31 |
| | Tailings | 85.89 | 2.35 | 0.90 | 67.32 | 34.48 | 12.81 | 94.69 |
| | Feed | 100.00 | 5.85 | 6.03 | 61.06 | 100.00 | 100.00 | 100.00 |

Example 3A

This example provides a method for desulfurization from spodumene smelting slag, including:

S21, weighing 500 g of the spodumene smelting slag from a Jiangxi-based company into a 1.5 L flotation cell and adding water to mix, adjusting a concentration of a mineral slurry to 33%, and then stirring for 5 min; adding 1 kg/t NaOH and stirring for 5 min, at this time, a pH value is 8.2, and the mineral slurry is obtained; wherein the spodumene smelting slag includes 6.06% of CaO, 6.41% of $SO_3$, and 60.50% of $SiO_2$;

S22, adding 1000 g/t sodium silicate, 400 g/t sodium citrate and 50 g/t ethylenediaminetetra(methylenephosphonic acid) sodium salt to the mineral slurry, and then stirring for 5 min, then slurry 1 is obtained;

S23, adding 100 g/t collecting agent to slurry 1 and stirring for 5 min to conduct roughing, at this time, the pH value of the mineral slurry is 8; then conducting two scavengings, and adding 50 g/t collecting agent to each of the two scavengings, then the tailings from the scavengings are filtered and dried to obtain desulfurized lithium slag; a froth product from the roughing and the first scavenging are combined, and then transferred to a 0.75 L flotation cell, adding 0.2 kg/t NaOH, stirring for 3 min, at this time, the pH value of the mineral slurry is 9. Then conducting cleaning, and the concentrate obtained after cleaning is filtered and dried to yield a gypsum product; wherein the collecting agent is dodecylamine.

The flotation desulfurization results for Example 3A are shown in Table 3.

TABLE 3

| Experiment | | | Grade % | | | Recovery Rate % | | |
|---|---|---|---|---|---|---|---|---|
| Condition | Product Name | Yield % | CaO | $SO_3$ | $SiO_2$ | CaO | $SO_3$ | $SiO_2$ |
| Example 3A | Concentrate | 8.41 | 37.50 | 53.01 | 6.69 | 52.04 | 69.18 | 0.93 |
| | Middlings 2 | 4.02 | 4.59 | 5.53 | 60.64 | 3.04 | 3.44 | 4.02 |
| | Concentrate + Middlings 2 | 12.43 | 26.87 | 37.67 | 24.12 | 55.08 | 72.62 | 4.96 |
| | Middlings 1 | 20.65 | 6.06 | 6.15 | 58.89 | 20.64 | 19.70 | 20.10 |
| | Concentrate + Middlings 2 + Middlings 1 | 33.08 | 13.88 | 17.99 | 45.83 | 75.72 | 92.32 | 25.06 |
| | Tailings | 66.92 | 2.20 | 0.74 | 67.75 | 24.28 | 7.68 | 74.94 |
| | Feed | 100.00 | 6.06 | 6.45 | 60.50 | 100.00 | 100.00 | 100.00 |

Comparative Example 1A

The difference between Comparative Example 1A and Example 1A lies in the omission of NaOH, CaO, and the conditioning agent. The specific steps are as follows:

S21, weighing 500 g of the spodumene smelting slag from a Jiangxi-based company into a 1.5 L flotation cell and adding water to mix, adjusting a concentration of a mineral slurry to 33%, and then stirring for 5 min, at this time, a pH value is 7.8, and the mineral slurry is obtained; wherein the spodumene smelting slag includes 5.82% of CaO, 6.70% of $SO_3$, and 58.64% of $SiO_2$;

S22, adding 50 g/t collecting agent to the mineral slurry and stirring for 5 min to conduct roughing, at this time, the pH value of the mineral slurry is 7.6; then conducting three scavengings, and adding 50 g/t collecting agent to each of the three scavengings, then the tailings from the scavengings are filtered and dried to obtain desulfurized lithium slag; a froth product from the roughing and the first scavenging are combined, and then transferred to a 0.75 L flotation cell, at this time, the pH value of the mineral slurry is 7.5. Then the concentrate obtained after cleaning is filtered and dried to yield a gypsum product; wherein the collecting agent is dodecylamine.

The flotation desulfurization results for Comparative Example 1A are shown in Table 4.

TABLE 4

| Experiment | | | Grade % | | | Recovery Rate % | | |
|---|---|---|---|---|---|---|---|---|
| Condition | Product Name | Yield % | CaO | $SO_3$ | $SiO_2$ | CaO | $SO_3$ | $SiO_2$ |
| Comparative Example 1A | Concentrate | 13.74 | 22.73 | 34.96 | 27.52 | 53.68 | 71.71 | 6.45 |
| | Middlings 2 | 5.53 | 5.48 | 4.63 | 61.20 | 5.21 | 3.83 | 5.78 |
| | Concentrate + Middlings 2 | 19.27 | 17.78 | 26.25 | 37.19 | 58.89 | 75.73 | 12.22 |
| | Middlings 1 | 26.34 | 4.60 | 4.20 | 55.60 | 20.82 | 16.51 | 24.94 |
| | Concentrate + Middlings 2 + Middlings 1 | 45.61 | 10.17 | 13.52 | 47.82 | 79.71 | 92.04 | 37.19 |
| | Tailings | 54.39 | 2.17 | 0.98 | 67.72 | 20.29 | 7.96 | 62.81 |
| | Feed | 5.82 | 6.70 | 58.64 | 100.00 | 100.00 | 100.00 | 100.00 |

As demonstrated by the data in Tables 1 to 4, the concentrates of Examples 1A to 3A exhibit a combined grade of $CaO+SO_3$ greater than 90%, and a low $SiO_2$ grade, indicating that the method of the present disclosure achieves high desulfurization efficiency and enables deep separation of the gypsum from the silicates in the lithium slag, resulting in a high-purity gypsum product (with $CaSO_4$ content greater than 90%). Moreover, the tailings from Examples 1A to 3A exhibit an $SO_3$ grade of less than 1%, that is, the $SO_3$ content in the desulfurized lithium slag is less than 1%, thereby further substantiating the high desulfurization efficiency of the method according to the present disclosure.

In Comparative Example 1A, NaOH, CaO, and the conditioning agent were not added, the resulting concentrate showed a significant decrease in the combined grade of $CaO+SO_3$, which corresponds to a reduction in $CaSO_4$ content, and along with a notable increase in the $SiO_2$ grade. This demonstrates that Comparative Example 1A fails to achieve deep separation of the gypsum from the silicates in the lithium slag.

Comparative Example 2A

The difference between Comparative Example 2A and Example 1A lies in that, in step S22 of Comparative Example 2A, the conditioning agent does not contain sodium citrate, and sodium citrate is replaced with an equal mass of sodium silicate.

Comparative Example 3A

The difference between Comparative Example 3A and Example 1A lies in that, in step S22 of Comparative Example 3A, the conditioning agent does not contain ethylenediaminetetra(methylenephosphonic acid) sodium salt, and the ethylenediaminetetra(methylenephosphonic acid) sodium salt is replaced with an equal mass of sodium silicate.

Examples 4a to 10A

Example 4A

The difference between Example 4A and Example 1A lies in that, in step S21 of Example 4A, a total dosage of sodium silicate, sodium citrate, and ethylenediaminetetra(methylenephosphonic acid) sodium salt remains unchanged at 1200 g/t, while a mass ratio among sodium silicate, sodium citrate, and ethylenediaminetetra(methylenephosphonic acid) sodium salt is 25:5:1.

Example 5A

The difference between Example 5A and Example 1A lies in that, in step S21 of Example 5A, a total dosage of sodium silicate, sodium citrate, and ethylenediaminetetra(methylenephosphonic acid) sodium salt remains unchanged at 1200 g/t, while the mass ratio among sodium silicate, sodium citrate, and ethylenediaminetetra(methylenephosphonic acid) sodium salt is 40:10:1.

Example 6A

The difference between Example 6A and Example 1A lies in that, in step S23 of Example 6A, the collecting agent is cetyltrimethylammonium bromide.

Example 7A

The difference between Example 7A and Example 1A lies in that, in step S23 of Example 7A, the collecting agent is a mixture of dodecylamine and sodium petroleum sulfonate in a mass ratio of 2:1.

Example 8A

The difference between Example 8A and Example 1A lies in that, in step S23 of Example 8A, the collecting agent is a mixture of dodecylamine and sodium petroleum sulfonate in a mass ratio of 6:1.

Example 9A

The difference between Example 9A and Example 1A lies in that, in step S23 of Example 9A, the collecting agent is a mixture of dodecylamine and sodium petroleum sulfonate in a mass ratio of 10:1.

Example 10A

The difference between Example 10A and Example 1A lies in that, in step S21 of Example 10A, a pH value of the mineral slurry is 11, the specific steps are as follows:

S1, weighing 500 g of the spodumene smelting slag from a Jiangxi-based company into a 1.5 L flotation cell and adding water to mix, adjusting a concentration of a mineral slurry to 27%, and then stirring for 5 min; adding kg/t NaOH and stirring for 5 min, at this time, the pH value is 11, and the mineral slurry is obtained; wherein the spodumene smelting slag includes 5.79% of CaO, 6.22% of $SO_3$, and 60.12% of $SiO_2$;

S2, adding 1000 g/t sodium silicate, 100 g/t sodium citrate and 100 g/t ethylenediaminetetra(methylenephosphonic acid) sodium salt to the mineral slurry, and then stirring for 5 min, then slurry 1 is obtained;

S3, adding 50 g/t collecting agent to slurry 1 and stirring for 5 min to conduct roughing, at this time, the pH value of the mineral slurry is 10.4; then conducting three scavengings, and adding 50 g/t collecting agent to each of the three scavengings, then the tailings from the scavengings are filtered and dried to obtain desulfurized lithium slag; a froth product from the roughing and the first scavenging are combined, and then transferred to a 0.75 L flotation cell, adding 0.1 kg/t NaOH, stirring for 3 min, at this time, the pH value of the mineral slurry is 10.5. Then conducting cleaning, and the concentrate obtained after cleaning is filtered and dried to yield a gypsum product; wherein the collecting agent is dodecylamine.

The flotation desulfurization results for Comparative Examples 2A and 3A and Examples 4A to 10A are shown in Table 5.

TABLE 5

| Experiment Condition | Concentrate CaO Grade % | Concentrate $SO_3$ Grade % | Concentrate $SiO_2$ Grade % | Tailings $SO_3$ Grade % |
|---|---|---|---|---|
| Comparative Example 2A | 31.60 | 45.42 | 14.42 | 1.29 |
| Comparative Example 3A | 35.97 | 48.68 | 9.30 | 1.17 |
| Example 4A | 37.86 | 53.79 | 4.80 | 0.85 |
| Example 5A | 40.24 | 54.53 | 4.16 | 0.77 |
| Example 6A | 37.45 | 53.55 | 5.45 | 0.90 |
| Example 7A | 38.05 | 53.42 | 5.25 | 0.92 |
| Example 8A | 39.12 | 54.10 | 4.55 | 0.80 |
| Example 9A | 38.58 | 53.48 | 5.10 | 0.87 |
| Example 10A | 38.95 | 53.60 | 4.85 | 0.89 |

As can be seen from the test results in Table 5, the conditioning agent of Comparative Example 2A does not contain sodium citrate, and the conditioning agent of Comparative Example 3A does not contain ethylenediaminetetra (methylenephosphonic acid) sodium salt. The grades of CaO and $SO_3$ in the concentrate decreased, a purity of the gypsum product decreased, the grade of $SiO_2$ increased significantly, and the grade of $SO_3$ in the tailings increased, indicating ineffective separation of the gypsum from the silicates.

The differences between Example 4A, Example 5A, and Example 1A lie in the different mass ratios of sodium silicate, sodium citrate, and ethylenediaminetetra(methylenephosphonic acid) sodium salt. Among these, Example 5A exhibits the highest desulfurization efficiency and achieves an optimal separation effect between the gypsum and the silicates.

In Example 6A, the collecting agent is replaced with cetyltrimethylammonium bromide, which also achieves a favorable desulfurization efficiency and enables an effective separation of the gypsum from the silicates.

The differences between Examples 7A to 9A and Example 1A lie in a replacement of the single collecting agent dodecylamine with a composite system of the dodecylamine and the sodium petroleum sulfonate. Compared with Example 1A, Examples 7A to 9A exhibit an increase in the grades of CaO and $SO_3$ in the concentrate, a decrease in the grade of $SiO_2$, and a reduction in the grade of $SO_3$ in the tailings, thereby enhancing both desulfurization efficiency and the separation effect between the gypsum and the silicates. Wherein, Example 8A achieves the highest desulfurization efficiency and the optimal separation effect between the gypsum and the silicates.

In step S21 of Example 10A, the pH value of the mineral slurry is adjusted to 11, resulting in an increase in the grades of CaO and $SO_3$ in the concentrate, a decrease in the grade of $SiO_2$, and a reduction in the grade of $SO_3$ in the tailings, thereby enhancing both desulfurization efficiency and the separation effect between the gypsum and the silicates.

Lithium extraction technologies from the spodumene include the sulfuric acid method, the sulfate method, the limestone method, the chlorination roasting method, the autoclave method, fluorine-based chemical method, and roasting method. Currently, the mainstream lithium extraction process for the spodumene employs a two-stage roasting method, which suffers from problems such as high roasting temperatures and high energy consumption.

CN102765734A discloses a method for extracting lithium from spodumene to prepare lithium salts, including steps such as phase-transformation roasting, cooling and ball milling, acid roasting, slurry neutralization, separation and washing, and purification. The overall preparation process is complex, requires two-stage roasting to achieve lithium extraction, and exhibits high energy consumption and low efficiency.

CN108165767A discloses a method for leaching spodumene based on combination of microwave and pressure field. This method requires first grinding the spodumene concentrate to a particle size of 74 μm accounting for more than 80%, adding pulverized coal with a total mass of 2-8% of the raw materials and the particle size of the pulverized coal is 74 μm accounting for more than 80%, mixing uniformly to obtain a blended material, and then performing sintering under microwave irradiation to achieve crystal transformation, the subsequent leaching and separation-purification steps for purified lithium salts can be carried out.

CN103183366A discloses a soda ash pressure leaching method for extracting lithium salts from spodumene. The method includes roasting the spodumene concentrate at 1150° C.-1250° C. for phase transformation, then mixing it with soda ash and subjecting it to pressure leaching to obtain lithium carbonate, followed by acid transformation of the lithium carbonate to yield soluble lithium salts.

Although prior arts disclose one-step roasting processes for lithium extraction, they generally require prior crystal transformation of the spodumene before subsequent leaching can be performed. Most of these processes are complex or necessitate the use of strong acids or alkalis, rendering them unsuitable for large-scale industrial application.

Therefore, developing a lithium extraction method that eliminates the need for phase transformation roasting, features a simple process, and achieves high lithium extraction efficiency is of significant importance.

The present disclosure provides a method for leaching lithium from spodumene. The method introduces a roasting aid in combination with external field intensification, adopting a process route that integrates one-step roasting-aid phase transformation with external field intensified leaching, thereby optimizing the phase transformation roasting and shortening the process flow. The present disclosure employs external field synergistic intensification leaching to achieve selective and efficient extraction of the lithium from the spodumene. This enhances leaching efficiency while significantly reducing the content of impurity elements such as aluminum and silicon, etc.

Specific technical implementation can be carried out with reference to the method described in Example 1B below.

Example 1B

Figure 1B:
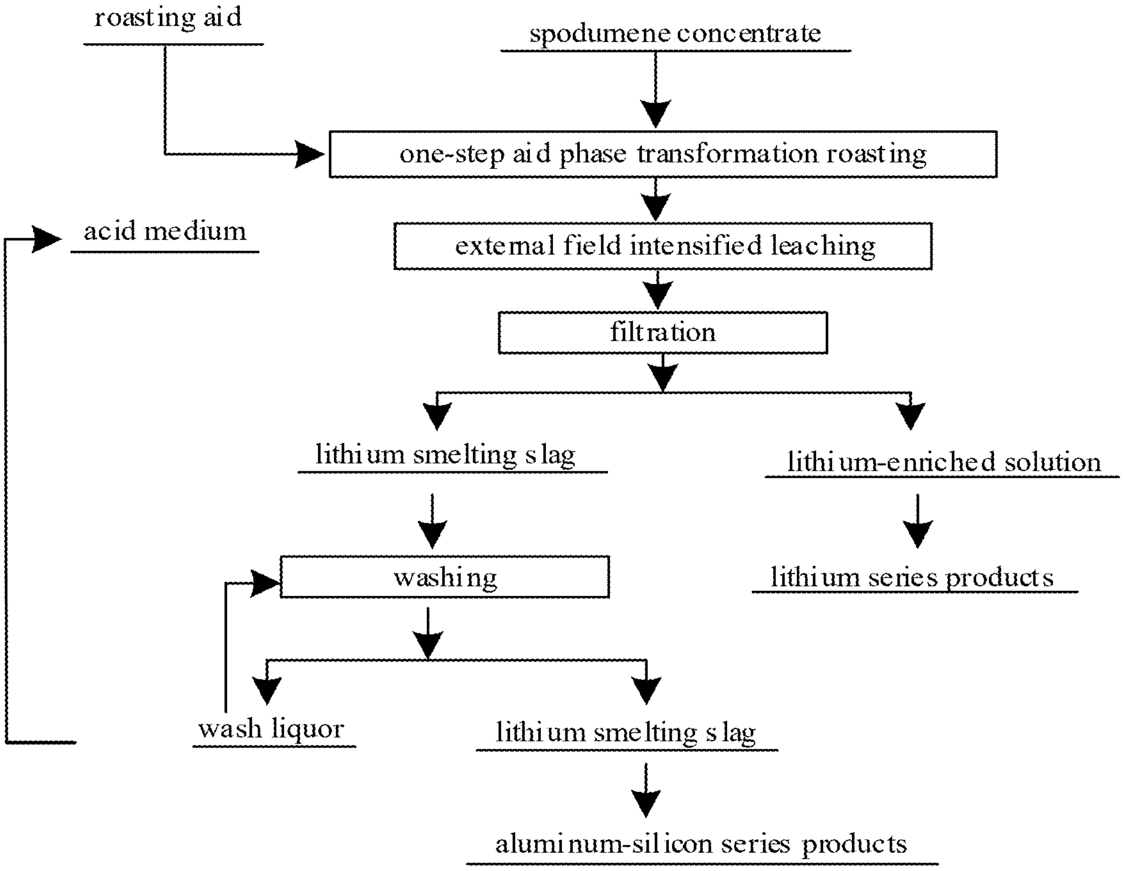
FIG. 1B is a process flowchart of a method for lithium extraction by leaching from spodumene according to Example 1B of the present disclosure.

The present disclosure provides a method for leaching lithium from spodumene, wherein a process flowchart of the method is shown in FIG. 1B, specifically:

(1) Spodumene concentrate is mixed thoroughly with a roasting aid (potassium sulfate and sodium fluoride in a mass ratio of 2:1) in a mass ratio of 6:1 to obtain a mixture, and the mixture is then reacted at a high temperature of 850° C. for 60 min to obtain a calcined clinker.

(2) Sulfuric acid solution with a concentration of 10 wt. % is mixed with the calcined clinker obtained in step (1) to form an acid-leached slurry, a liquid-to-solid ratio of the acid-leached slurry is 6 mL/g, the leaching is carried out in a mechanochemical intensification reactor, wherein enhanced leaching is performed under the intensifying effect of a mechanochemical field, a temperature for leaching is 60° C., a time for the leaching is 30 min, subsequently, the acid-leached slurry is subjected to filtration and separation to yield a lithium leaching solution and spodumene smelting slag. The spodumene smelting slag is washed with water via single-stage washing at a liquid-to-solid ratio of 6 mL/g and a temperature for the wash water is 60° C., the wash water is recycled back to step (2) for the acid leaching.

By dissolving and digesting the spodumene leaching residue and measuring the residual $Li_2O$ in the spodumene smelting slag, the lithium extraction rate is calculated. The lithium extraction rate from the spodumene achieved in this example is 97.7%.

Example 2B

The present disclosure provides a method for leaching lithium from spodumene, including:

(1) Spodumene concentrate is mixed thoroughly with a roasting aid (sodium fluoride) in a mass ratio of 1.5:1 to obtain a mixture, and the mixture is then reacted at a high temperature of 750° C. for 30 min to obtain a calcined clinker.

(2) Hydrochloric acid solution with a concentration of 30 wt. % is mixed with the calcined clinker obtained in step (1) to form an acid-leached slurry, a liquid-to-solid ratio of the acid-leached slurry is 4 mL/g, the leaching is carried out in a electrochemical intensification field, wherein enhanced leaching is performed under the intensifying effect of a electrochemical field, a temperature for leaching is 70° C., a time for the leaching is 60 min, subsequently, the acid-leached slurry is subjected to filtration and separation to yield a lithium leaching solution and spodumene smelting slag. The spodumene smelting slag is washed with water via single-stage washing at a liquid-to-solid ratio of 4 mL/g and a temperature for the wash water is 60° C., the wash water is recycled back to step (2) for the acid leaching.

By dissolving and digesting the spodumene leaching residue and measuring the residual $Li_2O$ in the spodumene smelting slag, the lithium extraction rate is calculated. The lithium extraction rate from the spodumene achieved in this example is 96.2%.

Example 3B

The present disclosure provides a method for leaching lithium from spodumene, including:

(1) Spodumene concentrate is mixed thoroughly with a roasting aid (sodium carbonate and sodium fluoride in a mass ratio of 3:1) in a mass ratio of 10:1 to obtain a mixture, and the mixture is then reacted at a high temperature of 750° C. for 40 min to obtain a calcined clinker.

(2) Nitric acid solution with a concentration of 20 wt. % is mixed with the calcined clinker obtained in step (1) to form an acid-leached slurry, a liquid-to-solid ratio of the acid-leached slurry is 5 mL/g, the leaching is carried out in an ultrasonic intensification field at a frequency of 40 kHz, wherein enhanced leaching is performed under the intensifying effect of the ultrasonic field, a temperature for leaching is 90° C., a time for the leaching is 30 min, subsequently, the acid-leached slurry is subjected to filtration and separation to yield a lithium leaching solution and spodumene smelting slag. The spodumene smelting slag is washed with water via three-stage countercurrent washing at a liquid-to-solid ratio of 5 mL/g and a temperature for the wash water is 70° C., the wash water is recycled back to step (2) for the acid leaching.

By dissolving and digesting the spodumene leaching residue and measuring the residual $Li_2O$ in the spodumene smelting slag, the lithium extraction rate is calculated. The lithium extraction rate from the spodumene achieved in this example is 95.4%.

Example 4B

The present disclosure provides a method for leaching lithium from spodumene, including:

(1) Spodumene concentrate is mixed thoroughly with a roasting aid (potassium sulfate and sodium fluoride in a mass ratio of 2:1) in a mass ratio of 8:1 to obtain a mixture, and the mixture is then reacted at a high temperature of 820° C. for 10 min to obtain a calcined clinker.

(2) Phosphoric acid solution with a concentration of 30 wt. % is mixed with the calcined clinker obtained in step (1) to form an acid-leached slurry, a liquid-to-solid ratio of the acid-leached slurry is 2 mL/g, the leaching is carried out in a mechanochemical intensification reactor, wherein enhanced leaching is performed under the intensifying effect of a mechanochemical field, a temperature for leaching is 20° C., a time for the leaching is 90 min, subsequently, the acid-leached slurry is subjected to filtration and separation to yield a lithium leaching solution and spodumene smelting slag. The spodumene smelting slag is washed with water via three-stage countercurrent washing at a liquid-to-solid ratio of 10 mL/g and a temperature for the wash water is 50° C., the wash water is recycled back to step (2) for the acid leaching.

By dissolving and digesting the spodumene leaching residue and measuring the residual $Li_2O$ in the spodumene smelting slag, the lithium extraction rate is calculated. The lithium extraction rate from the spodumene achieved in this example is 95.7%.

Example 5B

The present disclosure provides a method for leaching lithium from spodumene, including:

(1) Spodumene concentrate is mixed thoroughly with a roasting aid (potassium sulfate and sodium fluoride in a mass ratio of 1:1) in a mass ratio of 3:1 to obtain a mixture, and the mixture is then reacted at a high temperature of 850° C. for 60 min to obtain a calcined clinker.

(2) Sulfuric acid solution with a concentration of 5 wt. % is mixed with the calcined clinker obtained in step (1) to form an acid-leached slurry, a liquid-to-solid ratio of the acid-leached slurry is 6 mL/g, the leaching is carried out in a mechanochemical intensification reactor, wherein enhanced leaching is performed under the intensifying effect of a mechanochemical field, a temperature for leaching is 60° C., a time for the leaching is 30 min, subsequently, the acid-leached slurry is subjected to filtration and separation to yield a lithium leaching solution and spodumene smelting slag. The spodumene smelting slag is washed with water via single-stage washing at a liquid-to-solid ratio of 2 mL/g and a temperature for the wash water is 20° C., the wash water is recycled back to step (2) for the acid leaching.

By dissolving and digesting the spodumene leaching residue and measuring the residual $Li_2O$ in the spodumene smelting slag, the lithium extraction rate is calculated. The lithium extraction rate from the spodumene achieved in this example is 96.7%.

Comparative Example 1B

The comparative example provides a method for leaching lithium from spodumene. The method is the same as that of Example 1B except that no roasting aid is added.

By dissolving and digesting the spodumene leaching residue and measuring the residual $Li_2O$ in the spodumene smelting slag, the lithium extraction rate is calculated. The lithium extraction rate from the spodumene achieved in this comparative example is 93.2%.

Comparative Example 2B

The comparative example provides a method for leaching lithium from spodumene. The method is the same as that of Example 1B except that no mechanochemical field is added.

By dissolving and digesting the spodumene leaching residue and measuring the residual $Li_2O$ in the spodumene smelting slag, the lithium extraction rate is calculated. The lithium extraction rate from the spodumene achieved in this comparative example is 92.9%.

Comparative Example 3B

The comparative example provides a method for enhanced leaching lithium from spodumene, including:

(1) subjecting spodumene to a high-temperature phase transformation roasting at 1150° C. for 60 min, followed by mixing sulfuric acid with a concentration of 98 wt. % and performing acid roasting at 250° C. for 30 min to obtain an acid-calcined clinker; and (2) subjecting the acid-calcined clinker obtained in step (1) to water leaching at a liquid-to-solid ratio of 4 mL/g, with a temperature for leaching of 20° C. and a time for the leaching of 30 minutes, subsequently, filtering and separating the acid-leached mineral slurry to yield a lithium leaching solution and spodumene smelting slag, washing the spodumene smelting slag with water via single-stage washing at a liquid-to-solid ratio of 4 mL/g and a temperature of wash water of 40° C., and recycling the wash water back to step (2) for the acid leaching.

By dissolving and digesting the spodumene leaching residue and measuring the residual $Li_2O$ in the spodumene smelting slag, the lithium extraction rate is calculated. The lithium extraction rate from the spodumene achieved in this comparative example is 92.3%.

In the present disclosure, a process route combining one-step roasting-aid phase transformation with external field intensified leaching for lithium extraction is provided by introducing the roasting aid combined with external field intensification. The roasting aid is used to disrupt the bonding state between lithium and other elements in the spodumene. Through low-temperature roasting, the lithium-bearing mineral phases in the spodumene is effectively activated, enhancing the reactivity of inert Li therein, and enabling efficient mineral phase restructuring of the spodumene. Furthermore, lithium extraction from spodumene is intensified under the synergistic effect of an external field, enabling efficient leaching of lithium using acid alone, shortening the lithium extraction leaching process. Based on Example 1B to Example 5B, the method provided by the present disclosure requires one-step roasting to achieve a leaching rate of lithium in spodumene at over 95.4%.

Compared with Example 1B, Comparative Example 3B replaces the aid roasting in step (1) with a two-step roasting process consisting of high-temperature phase transformation roasting and acid roasting, yielding a calcined clinker whose mineral phase structure is predominantly lithium sulfate, then by leaching to obtain a lithium-enriched solution, and no mechanochemical field intensification is applied in step (2). Compared with Example 1B, Comparative Example 3B exhibits problems such as high energy consumption due to the two-stage roasting and a relatively lower lithium leaching rate.

Finally, it should be noted that: the above examples are only used for describing the technical solutions of the present disclosure, and are not intended to limit the present disclosure; although the present disclosure is described in detail with reference to the preceding examples, it should be understood by those of ordinary skills in the art that: it is still possible to modify the technical solutions recorded in the preceding examples, or to equivalently replace some of the technical features therein, and these modifications or replacements do not make the essence of the corresponding technical solutions depart from the spirit and scope of the technical solutions of the examples of the present disclosure.

What is claimed is:

1. A method for lithium extraction by leaching from spodumene and desulfurization, comprising:

extracting lithium by leaching from spodumene to obtain lithium leaching solution and spodumene smelting slag; and performing desulfurization on the spodumene smelting slag to obtain a gypsum product and desulfurized lithium slag;

wherein the desulfurization comprises:

S21, mixing the spodumene smelting slag with water, and adjusting a pH value to 8-12.5 to prepare a mineral slurry;

S22, adding a conditioning agent to the mineral slurry for conditioning to obtain slurry 1; wherein the conditioning agent comprises sodium silicate, sodium citrate, and ethylenediaminetetra(methylenephosphonic acid) sodium salt; and S23, adding a collecting agent to the slurry 1, performing flotation desulfurization, followed by filtration and drying, to obtain the gypsum product and the desulfurized lithium slag.

2. The method according to claim 1, wherein, in step S21, the spodumene smelting slag comprises 5.79%-6.06% of CaO, 6.03%-6.70% of $SO_3$, and 58.64%-61.06% of $SiO_2$.

3. The method according to claim 1, wherein, in step S21, a mass concentration of the mineral slurry ranges from 27% to 33%.

4. The method according to claim 1, wherein, in step S21, adjusting the pH value to 8-12.5 comprises adding a pH conditioning agent to the mineral slurry formed by mixing the spodumene smelting slag with water, and the pH conditioning agent comprises at least one of NaOH, $Na_2CO_3$, $Ca(OH)_2$, CaO, $K_2CO_3$, or $CaCO_3$.

5. The method according to claim 1, wherein, in step S22, a mass ratio of sodium silicate, sodium citrate, and ethylenediaminetetra(methylenephosphonic acid) sodium salt is (10-40):(1-10):1.

6. The method according to claim 1, wherein, in step S23, the collecting agent comprises at least one of dodecylamine, cetyltrimethylammonium bromide, sodium petroleum sulfonate, or sodium oleate.

7. The method according to claim 6, wherein the collecting agent is dodecylamine and sodium petroleum sulfonate, a mass ratio of dodecylamine and sodium petroleum sulfonate is (2-10):1.

8. The method according to claim 1, wherein, in step S23, the flotation desulfurization comprises one roughing, one cleaning, and two to three scavengings.

9. The method according to claim 8, wherein, during the roughing, an amount of the collecting agent ranges from 50 g/t to 100 g/t;

during the cleaning, the pH of the mineral slurry is adjusted to 9-11 with a pH conditioning agent; and during the scavenging, a total amount of the collecting agent ranges from 100 g/t to 150 g/t.

10. The method according to claim 1, wherein a purity of the gypsum product is greater than 90%; and an $SO_3$ content of the desulfurized lithium slag is less than 1%.

11. The method according to claim 1, wherein the extracting lithium by leaching comprises:

roasting a mixture of spodumene concentrate and a roasting aid to obtain a calcined clinker; and acid-leaching the calcined clinker under application of an external field, followed by solid-liquid separation, to obtain the lithium leaching solution and the spodumene smelting slag.

12. The method according to claim 11, wherein the roasting aid comprises any one or a combination of at least two of fluorides, sodium salts, or potassium salts.

13. The method according to claim 11, wherein a mass ratio of the spodumene concentrate and the roasting aid is (1-10):1.

14. The method according to claim 11, wherein a roasting temperature ranges from 750° C. to 1000° C.

15. The method according to claim 11, wherein the external field comprises any one or a combination of at least two of electrochemical field and/or ultrasonic field.

16. The method according to claim 11, wherein the acid-leaching comprises mixing the calcined clinker with an acid solution to obtain an acid-leached slurry;

in the acid-leached slurry, a solid-liquid ratio of the calcined clinker and the acid solution ranges from 2 mL/g to 10 mL/g.

17. The method according to claim 11, wherein a time for the acid-leaching ranges from 30 min to 90 min.

18. The method according to claim 16, wherein the acid solution comprises any one or a combination of at least two of sulfuric acid, hydrochloric acid, nitric acid, or phosphoric acid.

19. The method according to claim 11, wherein the method further comprises water washing the spodumene smelting slag obtained after solid-liquid separation.

20. The method according to claim 19, wherein, in the water washing process, a solid-liquid ratio of the spodumene smelting slag and the water ranges from 2 mL/g to 10 mL/g.

* * * * *